US010823496B2

(12) United States Patent
Hwang et al.

(10) Patent No.: US 10,823,496 B2
(45) Date of Patent: Nov. 3, 2020

(54) CONTENT AND CONTEXT AWARE REGIONAL COOLING OPTIMIZATION FOR REFRIGERATORS

(71) Applicant: International Business Machines Corporation, Armonk, NY (US)

(72) Inventors: Inseok Hwang, Austin, TX (US); Su Liu, Austin, TX (US); Eric J. Rozner, Austin, TX (US); Chungkuk Yoo, Yuseong-gu (KR)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 15/844,202

(22) Filed: Dec. 15, 2017

(65) Prior Publication Data

US 2019/0186816 A1 Jun. 20, 2019

(51) Int. Cl.
*F25D 29/00* (2006.01)
*G05D 23/19* (2006.01)
(Continued)

(52) U.S. Cl.
CPC .............. *F25D 29/00* (2013.01); *F25D 11/02* (2013.01); *F25D 23/12* (2013.01);
(Continued)

(58) Field of Classification Search
CPC .......... F25D 29/00; F25D 23/12; F25D 11/02; G06K 9/00771; G05D 23/1917
See application file for complete search history.

(56) References Cited

U.S. PATENT DOCUMENTS 6,601,394 B2  8/2003  Tatter
7,673,464 B2  3/2010  Bodin et al.
(Continued)

FOREIGN PATENT DOCUMENTS

CN  101191688 A   6/2008
CN  103017475 B   3/2015
CN  106168432 A  11/2016

OTHER PUBLICATIONS

Epicurious post entitled "How to Use Your Refrigerators's Crisper Drawer." 9 pages, posted Aug. 9, 2016 by user "Tommy Werner". Retrieved from Internet: <https://www.epicurious.com/expert-advice/how-to-use-your-refrigerators-crisper-dra> (Year: 2016).*
(Continued)

*Primary Examiner* — Robert E Fennema
*Assistant Examiner* — Christopher W Carter
(74) *Attorney, Agent, or Firm* — Zilka-Kotab, P.C.

(57) ABSTRACT

A refrigerator-implemented method for optimizing placement of food items in different compartments of a refrigerator, according to one embodiment, includes: receiving a request to store a first type of food item in the refrigerator, determining, using detection hardware, each type of food item already stored in one or more of the compartments of the refrigerator, comparing a characteristic of the first type of food item with a same type of characteristic for each type of food item already stored in the one or more of the compartments of the refrigerator, selecting a first of the compartments in which to store the first type of food item based at least in part on the comparison, and outputting, using an output device, a recommendation to store the first type of food item in the first compartment. Other systems, methods, and computer program products are described in additional embodiments.

20 Claims, 9 Drawing Sheets

(51) Int. Cl.

| | |
|---|---|
| *G06K 9/00* | (2006.01) |
| *F25D 11/02* | (2006.01) |
| *F25D 23/12* | (2006.01) |
| *G06Q 10/00* | (2012.01) |
| *G06K 7/10* | (2006.01) |
| *G06K 7/14* | (2006.01) |
| *G05B 15/02* | (2006.01) |

(52) U.S. Cl.
CPC ..... *G05D 23/1917* (2013.01); *G06K 9/00771* (2013.01); *G06Q 10/00* (2013.01); *F25D 2500/06* (2013.01); *F25D 2600/04* (2013.01); *F25D 2700/06* (2013.01); *F25D 2700/08* (2013.01); *G05B 15/02* (2013.01); *G06K 7/10297* (2013.01); *G06K 7/1413* (2013.01)

(56) References Cited

U.S. PATENT DOCUMENTS

| | | | |
|---|---|---|---|
| 9,449,208 | B2 | 9/2016 | Luk et al. |
| 10,655,907 | B2 | 5/2020 | Hwang et al. |
| 2007/0163275 | A1 | 7/2007 | Ha et al. |
| 2008/0047282 | A1* | 2/2008 | Bodin .................. G06Q 10/08 62/129 |
| 2009/0029016 | A1 | 1/2009 | Pfister et al. |
| 2011/0210822 | A1 | 9/2011 | Lee et al. |
| 2014/0230472 | A1 | 8/2014 | Coradetti et al. |
| 2016/0162715 | A1 | 6/2016 | Luk et al. |
| 2016/0358508 | A1 | 12/2016 | Cheatham, III et al. |
| 2017/0089598 | A1 | 3/2017 | Wallace et al. |
| 2017/0123600 | A1* | 5/2017 | Jones-McFadden .......................... G06F 3/0482 |
| 2017/0262973 | A1 | 9/2017 | Johnston |
| 2017/0353327 | A1 | 12/2017 | Doberstein et al. |
| 2018/0003572 | A1 | 1/2018 | Garsd et al. |
| 2018/0106523 | A1 | 4/2018 | Besore et al. |
| 2018/0106532 | A1 | 4/2018 | Sugar et al. |
| 2018/0172343 | A1 | 6/2018 | Grimminger et al. |
| 2019/0008173 | A1 | 1/2019 | Park et al. |
| 2019/0186817 | A1 | 6/2019 | Hwang et al. |

OTHER PUBLICATIONS

Whirlpool, Top Mount Refrigerator, Form No. WR170104F. Specfiction Sheet [online]. Whirlpool, Oct. 2017 [retrieved on Jun. 12, 2019]. Retrieved from the Internet: <https://www.whirlpool.ca/content/dam/global/documents/201710/specification-sheet-WR170104F.pdf> (Year: 2017).*

Reviewed Refrigerators post entitled "11 Tips to Keep Your Refrigerator Costs Low" 3 pages, posted on Jul. 24, 2015 by Reviewed Staff. Retrieved from Internet. <https://www.reviewed.com/refrigerators/features/11-tips-to-keep-your-fridge-costs-low> (Year: 2015).*

Gu et al., "A Content-aware Fridge Based on RFID in Smart Home for Home-Healthcare," International Conference on Advanced Communication Technology, ICACT, Feb. 15-18, 2009, pp. 987-990.

The Engineering ToolBox, "Fruits and Vegetables—Optimal Storage Conditions," 2017, 4 pages, retrieved from http://www.engineeringtoolbox.com/fruits-vegetables-storage-conditions-d_710.html.

Thomson, J., "How You Store Your Fruits and Vegetables Might Be Causing Them to Spoil," Jul. 15, 2016, Buffington Post, pp. 1-5, retrieved from https://www.huffingtonpost.com/entry/how-to-store-fruits-and-vegetables_us_577fdb6fe4b0c590f7e92c1f.

Hwang et al., U.S. Appl. No. 15/844,167, filed Dec. 15, 2017.

List of IBM Patents or Patent Applications Treated As Related.

Notice of Allowance from U.S. Appl. No. 15/844,167, dated Jan. 10, 2020.

Corrected Notice of Allowance from U.S. Appl. No. 15/844,167, dated Apr. 9, 2020.

Non-Final Office Action from U.S. Appl. No. 15/844,167, dated Sep. 13, 2019.

* cited by examiner

| Food Item | Ideal Storage Temperature | | Approximate Storage Life |
|---|---|---|---|
| | °F | °C | |
| Apples | 30 - 40 | -1 - 4 | 1 - 12 months |
| Apricots | 31 - 32 | -1 - 0 | 1 - 3 weeks |
| Artichokes | 32 - 35 | 0 - 2 | |
| Jerusalem Artichokes | 31 - 32 | 0 - 2 | 4 - 5 months |
| Asparagus | 32 - 35 | 0 - 1.5 | 2 - 3 weeks |
| Avocados (Ripe) | 38 - 48 | 3 - 7 | |
| Avocados (Unripe) | 45 - 50 | 7 - 10 | |
| Bananas (Ripe) | 56 - 60 | 13 - 16 | |
| Bananas (Unripe) | 62 - 70 | 17 - 21 | |
| Basil | 52 - 59 | 11 - 15 | |
| Beans (Dry) | 40 - 50 | 4.5 - 10 | 6 - 10 months |
| Beans (Green/Snap) | 40 - 45 | 4.5 - 7 | 7 - 10 days |
| Beans (Sprouts) | 32 | 0 | 7 - 9 days |
| Beans (Lima) | 37 - 41 | 0 | 5 - 7 days |
| Beets (Bunched) | 32 | 0 | 10 - 14 days |
| Beets (Topped) | 32 | 0 | 4 - 6 months |
| Blackberries | 32 - 33 | 0 - 1 | 2 - 3 days |

FIG. 5

CONTENT AND CONTEXT AWARE REGIONAL COOLING OPTIMIZATION FOR REFRIGERATORS

BACKGROUND

The present invention relates to refrigeration, and more specifically, this invention relates to automatic content and/or context aware refrigeration.

A refrigerator is a popular household appliance which includes a thermally insulated compartment and mechanical components which are able to cool an interior of the insulated compartment to a temperature below an ambient temperature of the room in which the refrigerator is located. In other words, refrigerators are able to provide a confined space in which the temperature is controllable in a range below a temperature exterior the confined space. Refrigeration has served as an improvement in food storage as lower temperatures slows the reproduction rate of bacteria, thereby reducing the rate of spoilage.

Conventional refrigerators typically include one large compartment in which various items (e.g., food) may be stored and cooled. However, a result of having one large compartment is that everything placed therein is subjected to the same temperature. In many cases, having a single compartment set to hold a certain temperature is desirable and serves as an effective way to cool various items. However, different foods have a wide range of "ideal" temperatures at which they are stored, and therefore conventional refrigerators lack efficiency in maintaining the overall longevity of the various food items that may be stored therein.

SUMMARY

A refrigerator-implemented method for optimizing placement of food items in different compartments of a refrigerator, according to one embodiment, includes: receiving a request to store a first type of food item in the refrigerator, determining, using detection hardware, each type of food item already stored in one or more of the compartments of the refrigerator, comparing a characteristic of the first type of food item with a same type of characteristic for each type of food item already stored in the one or more of the compartments of the refrigerator, selecting a first of the compartments in which to store the first type of food item based at least in part on the comparison, and outputting, using an output device, a recommendation to store the first type of food item in the first compartment.

A computer program product for optimizing placement of food items in different compartments of a refrigerator, the computer program product, according to another embodiment, includes a computer readable storage medium having program instructions embodied therewith. The computer readable storage medium is not a transitory signal per se. Moreover, the program instructions are readable and/or executable by a processor to cause the processor to perform a method which includes: determining, by the processor, an ambient storage temperature in each of the different compartments of the refrigerator; evaluating, by the processor, whether the compartments are positioned relative to each other such that a temperature gradient between each pair of directly adjacent compartments is minimized; determining, by the processor, an order in which to rearrange the compartments in response to determining that the compartments are not positioned relative to each other such that a temperature gradient between each of the pairs of the directly adjacent compartments is minimized; and outputting, by the processor and using an output device, the determined order in which to rearrange the compartments.

A refrigerator, according to yet another embodiment, includes: sensors for determining types of food items in each of a plurality of compartments in the refrigerator; a controller in communication with the sensors, the controller being configured to: receive a request to store a first type of food item in the refrigerator; determine, using detection hardware, each type of food item already stored in one or more of the compartments of the refrigerator; compare a characteristic of the first type of food item with a same type of characteristic for each type of food item already stored in the one or more of the compartments of the refrigerator; and select a first of the compartments in which to store the first type of food item based at least in part on the comparison. Moreover, the refrigerator also includes an output device for outputting the recommendation to store the first type of food item in the first compartment.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 5 is a representational view of a food storage lookup table, in accordance with one embodiment.

DETAILED DESCRIPTION

Figure 1:
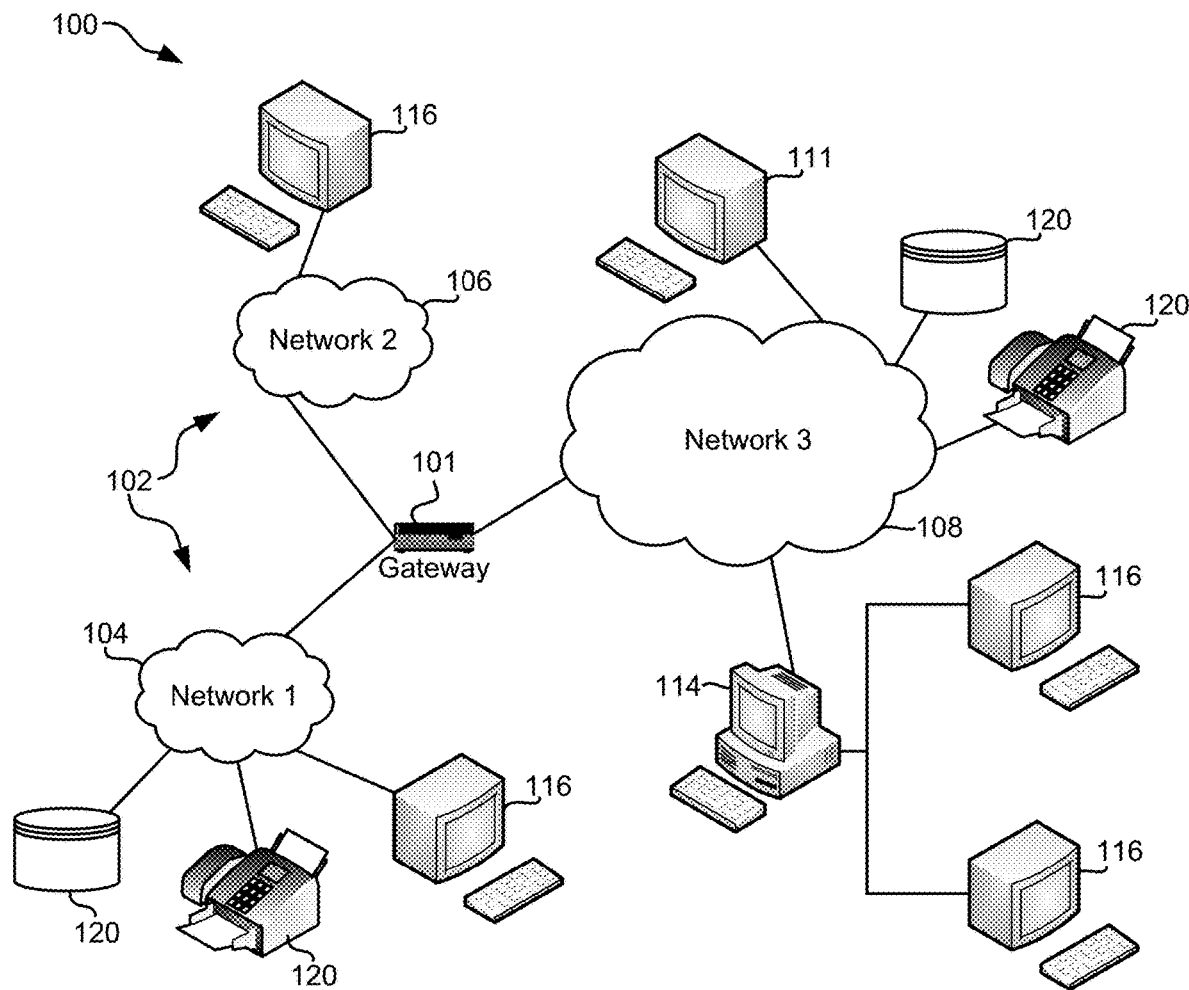
FIG. 1 is a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for actively and automatically controlling the temperature of different compartments in a refrigerator depending on the type of food item(s) stored therein. As a result, performance of the refrigerator as a whole is significantly improved, items stored in the refrigerator gain a longer storage life, consumption of resources (electricity) is reduced, etc., e.g., as will be described in further detail below.

In one general embodiment, a refrigerator-implemented method for optimizing placement of food items in different compartments of a refrigerator, includes: receiving a request to store a first type of food item in the refrigerator, determining, using detection hardware, each type of food item already stored in one or more of the compartments of the refrigerator, comparing a characteristic of the first type of food item with a same type of characteristic for each type of food item already stored in the one or more of the compartments of the refrigerator, selecting a first of the compartments in which to store the first type of food item based at least in part on the comparison, and outputting, using an output device, a recommendation to store the first type of food item in the first compartment.

In another general embodiment, a computer program product for optimizing placement of food items in different compartments of a refrigerator, the computer program product including a computer readable storage medium having program instructions embodied therewith. The computer readable storage medium is not a transitory signal per se. Moreover, the program instructions are readable and/or executable by a processor to cause the processor to perform a method which includes: determining, by the processor, an ambient storage temperature in each of the different compartments of the refrigerator; evaluating, by the processor, whether the compartments are positioned relative to each other such that a temperature gradient between each of the pairs of directly adjacent compartments is minimized; determining, by the processor, an order in which to rearrange the compartments in response to determining that the compartments are not positioned relative to each other such that a temperature gradient between each of the pairs of directly adjacent compartments is minimized; and outputting, by the processor and using an output device, the determined order in which to rearrange the compartments.

In yet another general embodiment, a refrigerator, includes: sensors for determining types of food items in each of a plurality of compartments in the refrigerator; a controller in communication with the sensors, the controller being configured to: receive a request to store a first type of food item in the refrigerator; determine, using detection hardware, each type of food item already stored in one or more of the compartments of the refrigerator; compare a characteristic of the first type of food item with a same type of characteristic for each type of food item already stored in the one or more of the compartments of the refrigerator; and select a first of the compartments in which to store the first type of food item based at least in part on the comparison. Moreover, the refrigerator also includes an output device for outputting the recommendation to store the first type of food item in the first compartment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
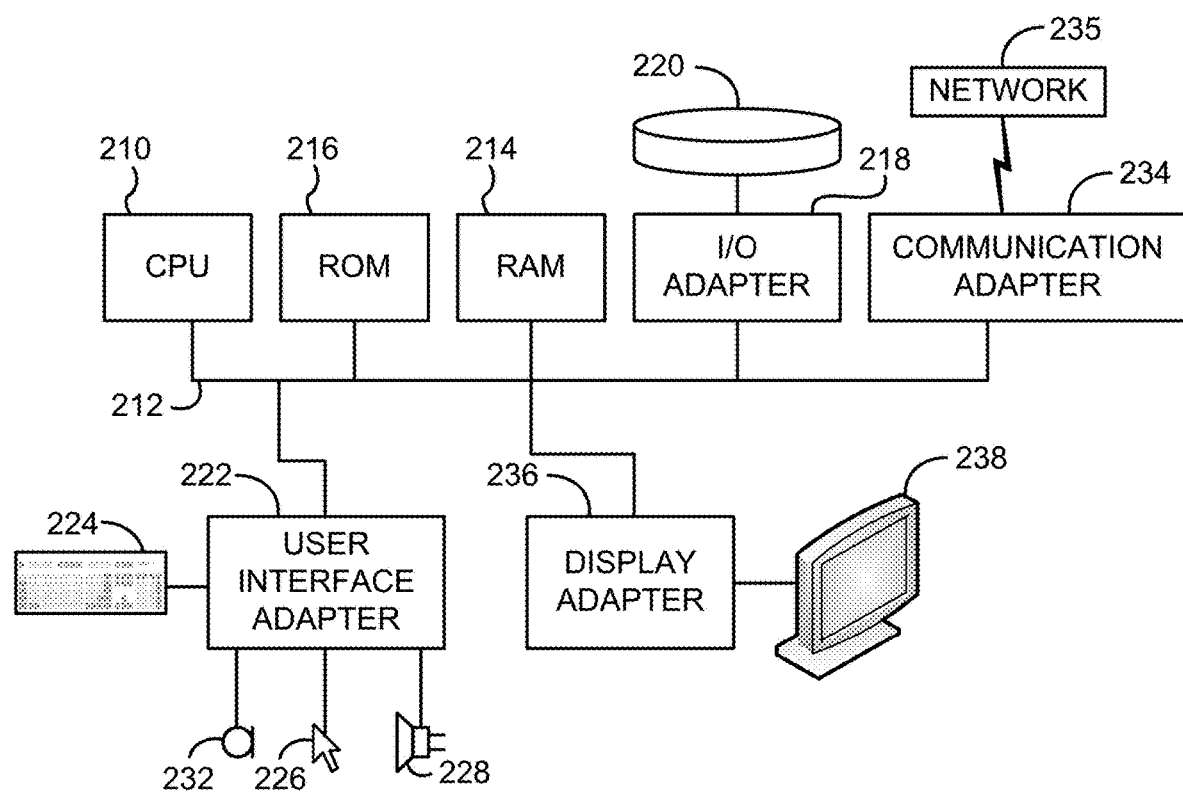
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

As previously mentioned, conventional refrigerators typically include one large compartment in which various items (e.g., food) may be stored and cooled. However, a result of having one large compartment is that everything placed therein is subjected to the same temperature. In many cases, having a single compartment set to hold a certain temperature is desirable and serves as an effective way to cool various items. However, different foods have a wide range of "ideal" temperatures at which they are stored, and therefore conventional refrigerators lack efficiency in maintaining the overall longevity of the various food items that may be stored therein. For example, the ideal storage temperature for one type of food may be too high for another type of food, thereby causing some of the food to go bad at an accelerated rate.

In sharp contrast, some of the embodiments described herein are able to achieve refrigeration schemes which are content and/or context aware. In other words, various embodiments included herein are able to achieve significant increases in cooling efficiency for refrigeration units. Moreover, these improvements may be achieved (e.g., realized) on the microscopic and/or macroscopic (e.g., regional) levels.

Figure 3A:
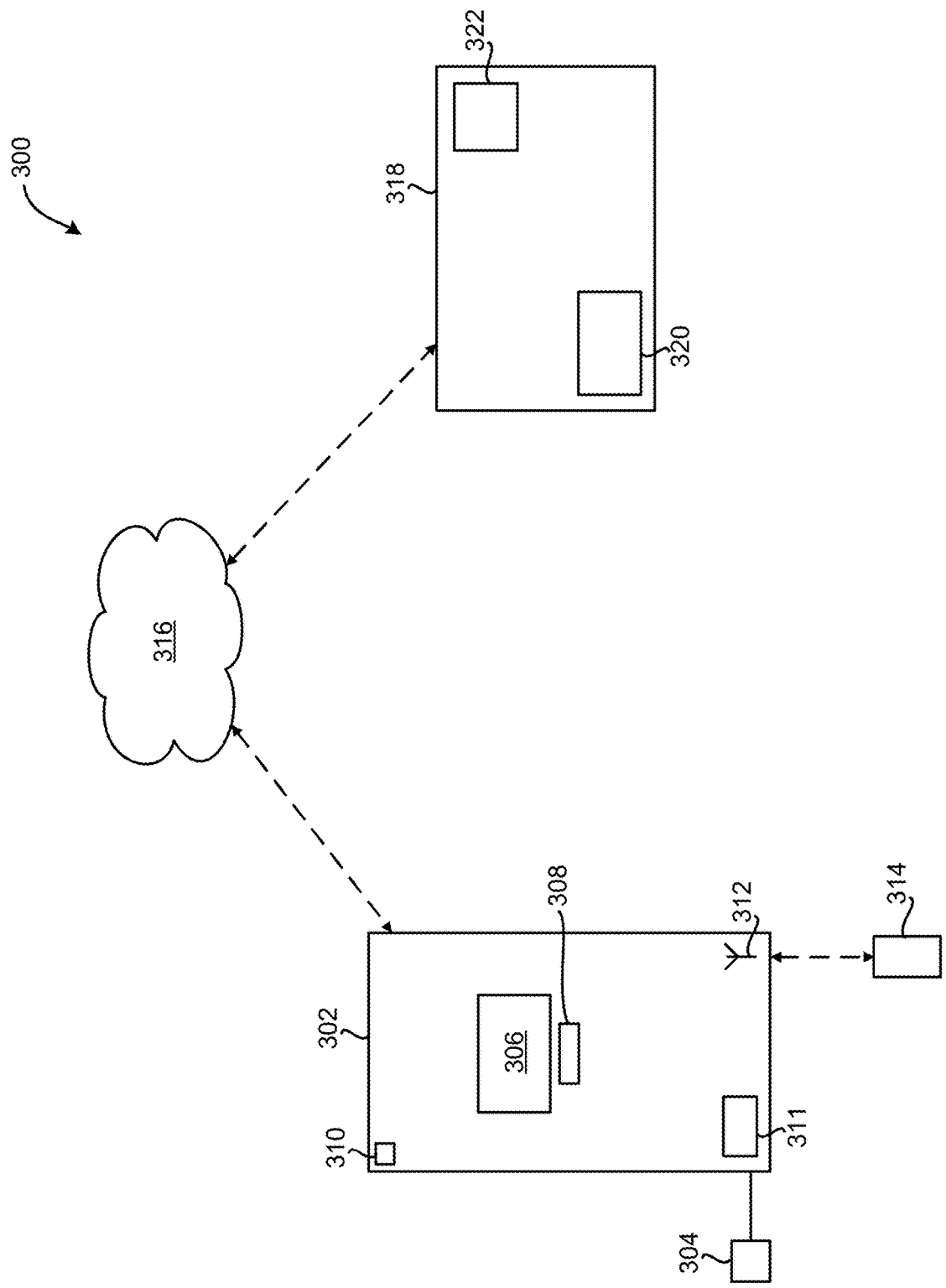
FIG. 3A is a partial representative view of a system, in accordance with one embodiment.
Figure 3B:
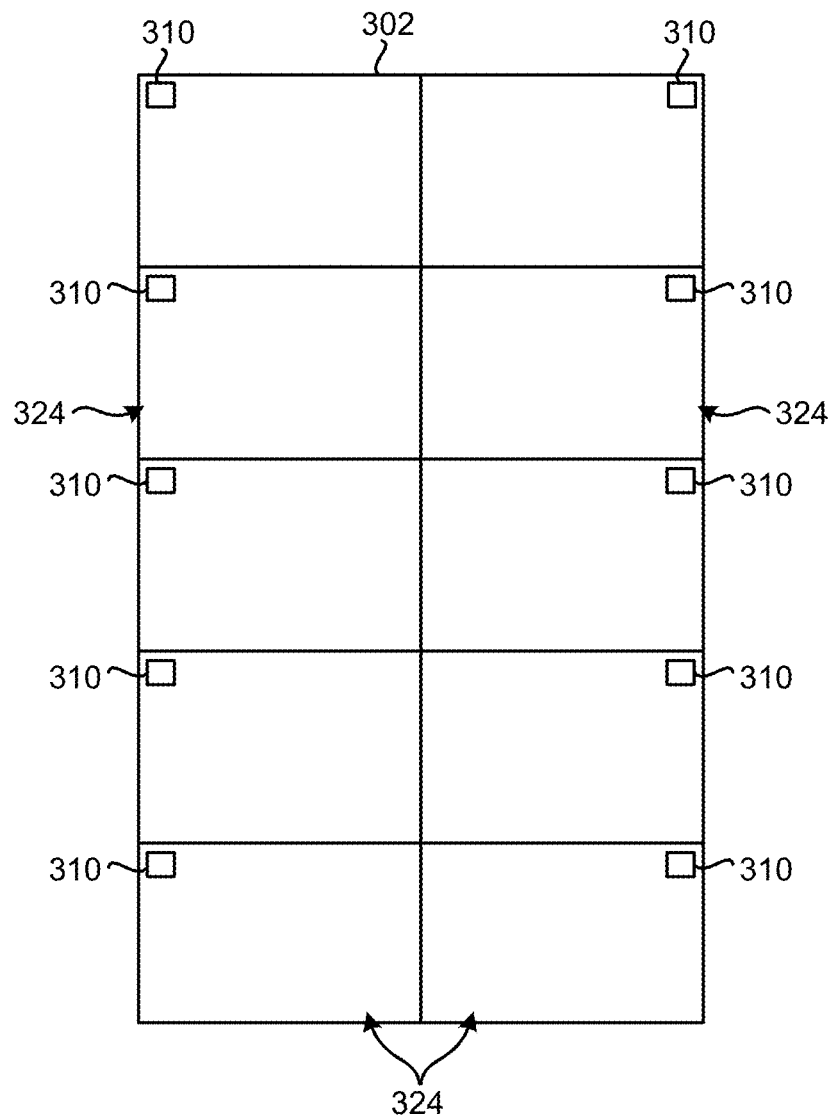
FIG. 3B is an interior view of a refrigerator in FIG. 3A, in accordance with one embodiment.

Looking now to FIGS. 3A-3B, a high level view of a system 300 having a refrigerator 302 is illustrated according to one embodiment. As an option, the present system 300 may be implemented in conjunction with features from any other embodiment listed herein, such as those described with reference to the other FIGS. However, such system 300 and others presented herein may be used in various applications and/or in permutations which may or may not be specifically described in the illustrative embodiments listed herein. Further, the system 300 presented herein may be used in any desired environment. Thus FIGS. 3A-3B (and the other FIGS.) may be deemed to include any possible permutation.

As mentioned above, the system 300 includes a refrigerator 302 which is coupled to a power source 304 as shown in FIG. 3A. Although the inner workings of the refrigerator 302 are not shown in the present embodiment (e.g., such as a compressor, a fan, etc.), the refrigerator 302 is shown as including a graphical user interface (GUI) 306, a barcode scanner 308, a camera 310, a controller 311, and an antenna 312. The GUI 306 may allow for the refrigerator 302 to display any desired information to a user. For example, the GUI 306 may be used to display an internal temperature of the refrigerator 302, a status of the refrigerator 302, information pertinent to a user (e.g., such as local weather, calendar events, news, email, etc.), a user manual, etc., or any other desired information. Moreover, the GUI 306 may also serve as a medium through which a user can provide input, e.g., such as adjusting a storage temperature inside the refrigerator 302, looking up cooking recipes, compiling a shopping list, etc.

The barcode scanner 308 may be used to scan barcodes of food items and/or other items as they are added to the interior of the refrigerator 302. Accordingly, the refrigerator may be able to keep track of what food items are currently stored therein and provide a desirably cooled storage environment, e.g., as will be described in further detail below. Moreover, the barcode scanner 308 may be used to add certain items to a shopping list with more specificity than simply typing in a description of the items.

The camera 310 may serve a number of functions as well. For instance, in some approaches the camera 310 may be accessible to a user, e.g., for taking pictures, videos, security monitoring, etc. In other approaches, the camera may be motion activated and may be able to detect various food items as they are being inserted into the refrigerator 302. Accordingly, in addition to the camera 310 on an exterior of the refrigerator 302, there may be one or more additional cameras located inside the refrigerator 302 (e.g., see FIG. 3B). The interior cameras may be placed at strategic locations in the refrigerator 302 such that a maximum number of food items may be identified. As mentioned above, by identifying food items or other types of items added to the refrigerator 302, a desirably cooled storage environment may be set and maintained, e.g., as will be described in further detail below.

The refrigerator 302 may receive various requests, commands, performance requirements, etc., while in use. The controller 311 is preferably electrically coupled to the refrigerator 302, and may be used to conduct various processes involving the performance of the refrigerator 302. Thus, the controller 311 may also be electrically coupled to an operating circuit (not shown) of the refrigerator 302 which is used to control the various performance characteristics of the refrigerator 302. Accordingly, the controller 311 may be used to perform various operations and/or decisions which involve the refrigerator's 302 performance, e.g., according to any of the embodiments described herein.

Although only a single antenna 312 is depicted in FIG. 3A, this is in no way intended to limit the invention. The type and functionality of the antenna 312 may vary depending on the approach. For instance, in some approaches the antenna 312 may be a Wi-Fi, Bluetooth, etc. antenna which is capable of connecting wirelessly to a user mobile device 314. In other approaches, the antenna 312 may additionally or alternatively serve as a wireless tag reader, e.g., such as a near field communication (NFC) reader, a radio-frequency identification (RFID) tag reader, etc. In still other approaches, the antenna 312 may provide the refrigerator 302 the ability to connect wirelessly to a network 316. However, it should be noted that in some approaches the refrigerator 302 may be connected to a network 316 by a wired (physical) connection, e.g., such as an Ethernet cable. In some approaches, the refrigerator 302 may include more than one type of antenna which are able to function without causing interference for each other.

The type of network 316 that the refrigerator 302 connects to may vary. For instance, the network 316 may be a WAN in order to provide the refrigerator 302 a connection to a remote storage location 318. However, in other approaches the network 316 may be a LAN, a metropolitan area network (MAN), a storage-area network (SAN), a virtual private network (VPN), or any other type of network which may be desired. It should also be noted that although the refrigerator 302 is connected to the remote storage location 318 by a wireless connection to the network 316, in some approaches the refrigerator may be coupled to the remote storage location 318 by a physical, wired connection.

The remote storage location 318 may include memory 320 and a controller (e.g., processor) 322 as illustrated. The memory 320 may be used to store data pertaining to user preferences, refrigerator settings, historical use, food item information, etc. The controller 322 is preferably able to receive and process requests which may pertain to data (e.g., information) stored in the memory 320. Moreover, the controller 322 may be able to perform one or more processes included in the various embodiments described herein, e.g., as will be described in further detail below.

Looking to FIG. 3B, an interior of the refrigerator 302 is shown in accordance with one embodiment which is in no way intended to limit the invention. For instance, although a camera 310 is included in each of the compartments 324 inside the refrigerator 302, the number and/or placement of cameras 310 may vary depending on the desired approach. However, including a camera 310 in each of the compartments 324 allows for increased detection of food items as they are added to the compartments. Moreover, by orienting the cameras 310 on or near an upper surface of each of the compartments 324, the cameras 310 are able to maximize their field of view and have a desirable vantage point of the various food items that may be included in a respective compartment 324. Accordingly, the configuration illustrated in FIG. 3B may be desirable in many situations, but it is in no way required.

Each of the compartments 324 are also preferably individually controllable and configured to maintain different unique ambient storage temperatures therein. In other words, each of the storage compartments 324 may maintain a different ambient storage temperature in the interior compartment thereof. It follows that in some approaches, each of the storage compartments 324 may be thermally insulated in order to reduce the effect that temperatures of adjacent compartments and/or the refrigerator 302 as a whole have. Moreover, the individual control of the temperature in each of the various compartments 324 may be achieved by using baffling that controls the amount of cold air delivered to each of the compartments 324 from a central refrigeration unit (e.g., chiller), using more than one refrigeration unit to chill respective subsets of the compartments 324, fans that selectively direct cold air to specific ones of the compartments 324, etc.

Figure 4:
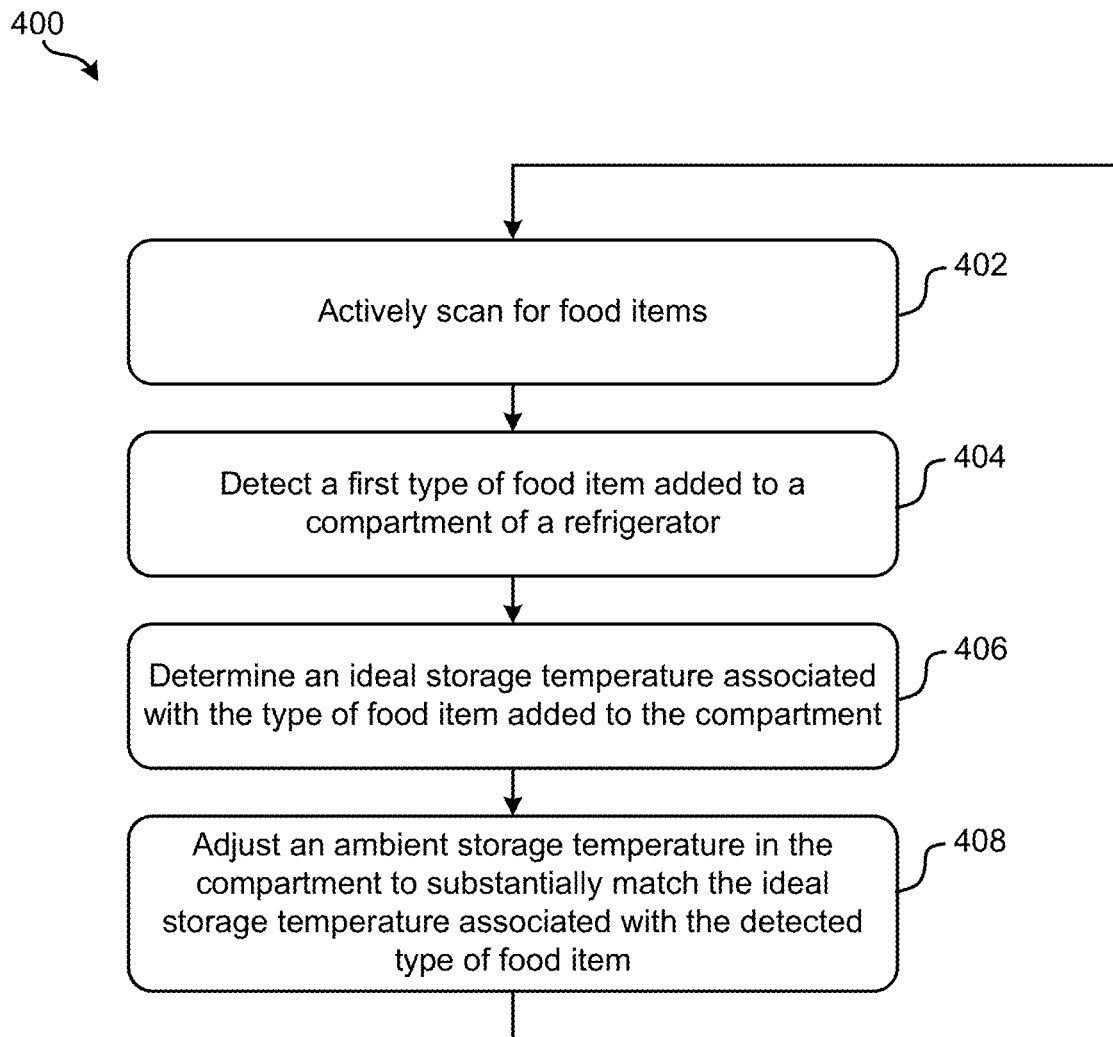
FIG. 4 is a flowchart of a method, in accordance with one embodiment.

Referring now to FIG. 4, a flowchart of a computer-implemented method 400 for controlling temperature settings based on types of food items added to a refrigerator is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, operation 402 of method 400 includes actively scanning for food items. Depending on the refrigerator, different components may be used to detect new food items. For instance, a refrigerator may use a barcode scanner, a wireless tag reader, a GUI, a camera, etc. in order to actively scan for food items in a certain proximity of the refrigerator. However, it is preferred that this proximity is close enough to the actual refrigerator such that food items which are not ultimately stored in the refrigerator are not detected for further evaluation. Thus, in some approaches the refrigerator may actively scan for nearby food items upon detecting that a front door to the refrigerator has been opened, upon detecting motion (e.g., using a motion detector), at a certain time of day based on historical use, etc.

According to some approaches, the refrigerator may enter a standby state after an amount of inactivity, at predetermined times (e.g., late at night), upon receiving user input to do so, etc. As a result, the refrigerator may be able to reduce energy consumption, prolong the lifetime of the various refrigerator components, etc.

Once a food item is actually detected, appropriate action may be taken. Accordingly, operation 404 includes detecting a first type of food item added to a first compartment of a refrigerator. It should also be noted that "added to" as used herein preferably refers to adding something such as a food item into a specific compartment of the refrigerator. However, the point at which the detection is made in operation 404 may be during the act of adding the food item to a specific compartment and/or after the food item has been added to the compartment. The timing associated with performing operation 404 or any of the other operations included herein may vary depending on the type of detection used, an amount of detection components (hardware) integrated with the refrigerator, a type of food item being added to the refrigerator, etc. For example, the barcode on a carton of milk may be scanned by a user before a door to the refrigerator is opened and the milk is placed in a specific compartment. Thus, the type of food item may be detected by the refrigerator before it is added thereto. Yet in another example, a single unmarked apple may simply be added to a given compartment in the refrigerator without any other input, whereby a camera positioned in the compartment that the apple was added to may capture images of the apple which are processed using image recognition software, ultimately determining that an apple has been added to the compartment at a later point in time.

It follows that, depending on the type of refrigerator and/or the type of detection component(s) integrated with the refrigerator, types of food items added to a compartment in the refrigerator may be detected (e.g., recognized, determined, etc.) in different ways. For instance, in some approaches the refrigerator may include a barcode scanner. Accordingly, the refrigerator may determine a type of food item as it is being added to the refrigerator in response to a user positioning the food item relative to the barcode scanner of the refrigerator such that a barcode of the food item may be scanned, and the corresponding food item information looked up, e.g., from a table. In other approaches, the refrigerator may include a wireless tag reader such as a radio-frequency identification (RFID) tag reader, NFC reader, etc. which is able to detect a wireless tag coupled to the food item and/or packaging thereof. Moreover, the wireless tag reader may be able to gather information about the food item from the wireless tag itself, and/or access food item information from memory, e.g., using a lookup table.

Furthermore, in other approaches the refrigerator may use a camera integrated with the refrigerator in order to detect a type of food item added to a compartment of the refrigerator. For instance, a digital camera may be integrated with an exterior surface (e.g., the door to the refrigerator, a top of the refrigerator, a side of the refrigerator, etc.), and therefore be able to "see" food items as they are brought by a user to the refrigerator. Moreover, image recognition software may be used to evaluate a feed (e.g., input) from the digital camera such that certain food items may be detected. Depending on the approach, the image recognition software may be used to evaluate the digital camera feed at the refrigerator itself (e.g., using an onboard controller), or at a remote (or at least removed) storage location which includes one or more controllers and preferably memory to implement the image recognition software, e.g., as would be appreciated by one skilled in the art after reading the present description.

Referring still to FIG. 4, operation 406 includes determining an ideal storage temperature associated with the type of food item added to the first compartment. As previously mentioned, different types of food items have an "ideal" storage temperature which may lengthen a shelf life of the respective food item to a maximum potential, optimize a taste or texture of the food item, conserve nutrients in the food item for an optimal amount of time, correspond to user preferences, etc. Accordingly, upon determining a type of food item that is being added or which has already been added to a compartment of the refrigerator, it is desirable to determine an ideal storage temperature associated with that type of food item, such that the storage temperature may be adjusted accordingly (e.g., see operation 408 below).

The ideal storage temperature may be determined by accessing a lookup table in memory of the refrigerator itself, or remote memory which the refrigerator may be able to access (e.g., see FIG. 3 above). The lookup table may associate a number of different types of food items with their ideal storage temperature, a corresponding approximate storage life, similarities between different types of food items, etc. Referring momentarily to FIG. 5, an exemplary food storage lookup table 500 is illustrated in accordance with one embodiment which is in no way intended to limit the invention. As shown, the lookup table 500 includes a number of different types of food items, an ideal storage temperature range for each of the food items, and an approximate storage life for a number of the respective food items if stored at a temperature in the listed ideal storage temperature range.

It should also be noted that an "ideal storage temperature" used herein is not necessarily limited to a single, specific number, but may also include a range of temperatures that collectively may be considered an ideal storage temperature. Therefore, the term "ideal storage temperature" is intended to also encompass temperature ranges. For example, each type of food item may have a desirable ideal range in terms of the temperature of the ambient environment in which they are stored. Moreover, a user may be able to provide input and/or manually adjust the ideal temperature value or range at which different types of food items are stored, e.g., based on personal preference, the time of year, a ripeness of the food item, etc. In some situations, a refrigerator may even be able to override the ideal temperature range in order to adapt to different conditions which may have an effect on certain food items stored in the refrigerator. For instance, the refrigerator may be able to detect upcoming events and determine whether food items corresponding to that event will be at a desirable (e.g., optimal) temperature by that time, e.g., see FIG. 6 below.

Referring back to FIG. 4, method 400 further includes adjusting an ambient storage temperature in the first compartment to substantially match the ideal storage temperature associated with the first type of food item. See operation 408. As described above, each of the compartments in the refrigerator are preferably individually controllable and configured to maintain different unique ambient storage temperatures therein. The manner in which the temperature is actually adjusted in each of the compartments may vary depending on the approach, and may implement using baffling, fans, multiple cooling units, etc. as previously mentioned. Also, where the ideal storage temperature of the first type of food item is a range, the storage temperature in the first compartment may be set to a value in said range.

Following operation 408, method 400 is shown as returning to operation 402 whereby the refrigerator may return to a scanning state. Moreover, upon detecting another food item, any one or more of the operations included in method 400 may be repeated for the newly detected food item. For instance, upon detecting a second type of food item added to a second compartment in the refrigerator, the second type of food item being different than the first type of food item, method 400 may repeat operation 406 for the second type of food item. Because the second type of food item is different than the first type of food item, there is a high probability that the second type of food item has a different ideal storage temperature than that associated with the first type of food item. Accordingly, the method 400 may automatically determine an ideal storage temperature associated with the second type of food item added to the second compartment. Upon determining the ideal storage temperature associated with the second type of food item, method 400 may desirably adjust an ambient storage temperature in the second compartment to substantially match the ideal storage temperature associated with the second type of food item. Again, the compartments included in a refrigerator as described herein are preferably individually controllable and configured to maintain different unique ambient storage temperatures according to any of the approaches mentioned above. It follows that method 400 is able to automatically recognize different types of food items inserted in different compartments of the refrigerator and make automatic adjustments to the ambient storage temperatures thereof in view of the recognized types of food items.

Although the processes included in method 400 are desirable in that each of the compartments in the refrigerator may automatically be set to a temperature which corresponds to the type of food item stored therein, additional factors may be taken into consideration when cooling a particular food item. For instance, although the ambient storage temperature in a given compartment may substantially match the ideal storage temperature associated with the type of food item stored therein, the food item may need to be exposed to that ideal storage temperature for a given amount of time before the actual (e.g., internal) temperature of the food item itself is reduced to the desirable range.

According to an example, which is in no way intended to limit the invention, after a long drive transporting shellfish bought at the store back home, the shellfish may be added to a given compartment of a refrigerator according to the operations included in method 400. Thus, the refrigerator may set the ambient storage temperature in the compartment to 40 degrees Fahrenheit, thereby creating an "ideal" storage environment for the shellfish. However, a user which purchased the shellfish on their way home from work may have plans to use the shellfish as an appetizer for a dinner soon after returning home. Thus, although the compartment in which the shellfish is stored is set to an ideal storage temperature, the shellfish may not actually cool down enough in time before the user hopes to serve the shellfish as an appetizer.

It follows that in certain time-sensitive situations, the storage conditions for certain food items may deviate from the "ideal" storage temperature in order to achieve a more efficient result. Moreover, a refrigerator may desirably be able to detect such situations and take the appropriate actions in order to achieve this increased efficiency without user intervention. Accordingly, referring now to FIG. 6, a method 600 for adjusting refrigeration settings based on future events is illustrated in accordance with one embodiment. The method 600 may be performed in accordance with the present invention in any of the environments depicted in FIGS. 1-5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

Moreover, any one or more of the processes included in method 600 may be performed automatically upon detecting a future event, e.g., as will soon become apparent.

Figure 6:
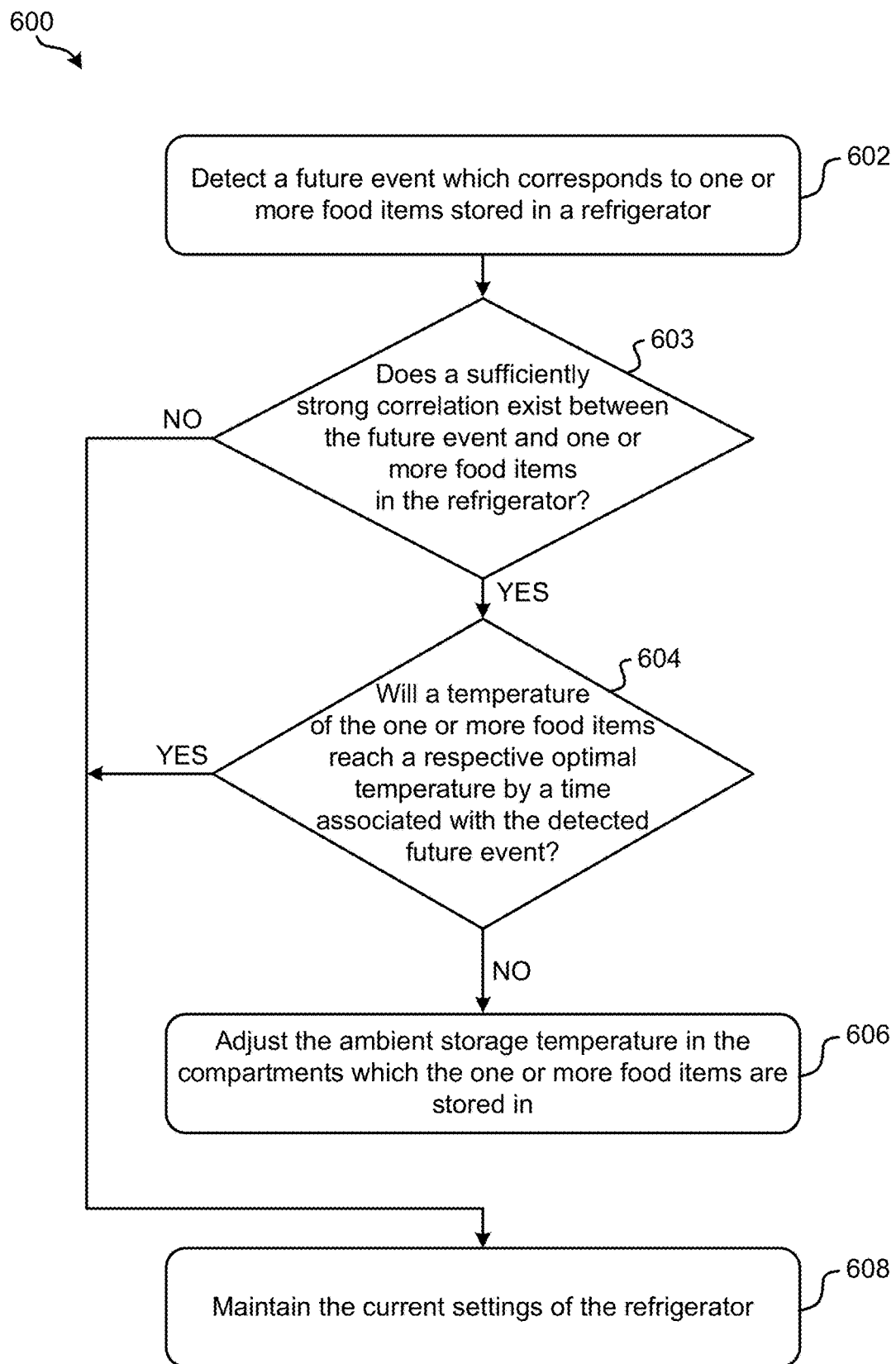
FIG. 6 is a flowchart of a method, in accordance with one embodiment.

As shown in FIG. 6, operation 602 of method 600 includes detecting a future event which corresponds to one or more food items stored in a refrigerator. The future event may be detected from a source of scheduling information which may include, but is not limited to, an email account, text messages, a calendar, a location of a user, a current time, audio conversation monitoring, etc. and/or combinations thereof depending on the approach. Accordingly the refrigerator may have one or more components which enables it to connect to, integrate with, detect, etc. various sources of scheduling information which corresponds to one or more users. For example, the refrigerator may include a microphone which is able to detect and analyze audio signals (e.g., speech) detected in a proximity of the refrigerator. According to another example, the refrigerator may include network connection and a controller which is able to connect to a server which manages a user's calendar. In yet another example, the refrigerator may include a wireless antenna and a processor which is able to access and evaluate text messages stored on a user's mobile phone.

In some approaches, although a future event is detected, additional processes of determining whether the future event is sufficiently correlated to one or more food items stored in the refrigerator may be made. According to one example, a controller at the refrigerator may implement a word2vec correlation of words corresponding to a detected event and words associated with food items currently stored in the refrigerator. A result of the word2vec correlation of the different words (terms) may subsequently be evaluated in order to determine whether the future event actually does correspond to one or more food items stored in a refrigerator. However, any desired process may be performed in order to determine whether the detected event corresponds to any food items in the refrigerator.

For instance, in some approaches an output of a correlation made between one or more words corresponding to a detected event and words associated with food items currently stored in the refrigerator may be compared to a threshold value. The threshold value may be predetermined, calculated in real time, set by a user, etc. If the output of the correlation is above the threshold, method 600 may proceed to decision 604. However, if the output of the correlation is below the threshold, then operation 602 may fail to return a future event which sufficiently (e.g., actually) corresponds to one or more food items stored in a refrigerator, and method 600 may effectively be ended. However, it should also be noted that "above the threshold" and "below the threshold" is in no way intended to limit the invention. Rather than determining whether a value is above or below a threshold, equivalent determinations may be made, e.g., as to whether a value is within a predetermined range, whether a value is outside a predetermined range, whether an absolute value is above a threshold, etc., depending on the desired approach.

Accordingly, decision 603 includes determining whether a sufficiently strong correlation between the future event detected in operation 602 and one or more of the food items stored in the refrigerator. Upon determining that a sufficiently strong correlation does not exist therebetween, method 600 jumps to operation 608, whereby the current (e.g., normal) cooling settings of the refrigerator are maintained. However, method 600 may proceed to decision 604 in response to determining that a sufficiently strong correlation does exist between the future event detected in operation 602 and one or more of the food items stored in the refrigerator.

As shown, decision 604 includes projecting (e.g., determining) whether a temperature of the one or more food items will reach a respective optimal temperature by a time associated with the detected future event. In other words, decision 604 includes determining whether the one or more food items determined to correspond to the detected future event will be at a desired temperature by the time the future event occurs. Although it may be difficult to actually measure the effective (e.g., internal) temperature of a food item stored inside a refrigerator, it may be approximated based on various conditions. For instance, cooling data for various different types of food items may be stored and used to approximate the temperature of a given food item. According to one example, although it may be difficult to physically measure the temperature of the liquid inside a soda can stored in a refrigerator, the approximate liquid temperature may be calculated based on an amount of liquid in the can, when the can was placed in a compartment of the refrigerator, an ambient temperature in the compartment while the can has been stored therein, a type of liquid included in the can, etc.

However, in some approaches the refrigerator may include added functionality which assist in making decision 604. For example, cameras placed in the interior of the refrigerator may be equipped with thermal imaging technology. Thus, the cameras may be able to approximate an internal temperature of various food items by evaluating a thermal scan of the food items. Moreover, in other approaches, the projection in decision 604 may be made at least in part by evaluating collected user context and/or historical data corresponding to previous use of the refrigerator (e.g., which may be stored in memory). According to yet other approaches, decision 604 may incorporate comparing temperature information associated with the food items with a threshold, or equivalently a desired range. In some approaches, internal and/or online databases may be consulted to determine the rate of cooling of the detected type of food item, calculate a time to cool the detected type of food item, etc.

In other approaches, determining an outcome for decision 604 may include using one or more thermal sensors (or thermal cameras), each of which may be positioned in each of the compartments. The thermal sensors may measure a current temperature of the food item and thereby develop a cooling strategy based on the current temperature of the item. Moreover, a scale which anticipates how long it may take to cool a particular type of food item to a desired internal temperature may be used as a part of developing the cooling strategy which may ultimately be implemented (e.g., in operation 606 below). According to an illustrative example, a thermal sensor may determine that the current temperature of a 23 ounce (oz.) bottle of champagne is currently at 70 degrees F. Moreover, the champagne may be sufficiently correlated to an upcoming party which begins in 30 minutes, whereby the refrigerator may initiate a cooling strategy which maximizes chilling of the champagne. In another example, a 3 oz. bottle of juice may have a current temperature of 70 degrees F. detected by a thermal sensor positioned in the same compartment of the refrigerator. Although the juice may be sufficiently correlated to an upcoming party which begins in 30 minutes, because of the small size of the juice bottle, the cooling strategy implemented to cool the juice may not be as aggressive as that used in the previous example to cool the champagne at a maximum rate.

It follows that determining the heat capacity of the food item may be desirable in order to perform decision 604 and/or operation 606, e.g., as will be further described below. According to some approaches, the heat capacity of a food item may be determined by incorporating the type of food item and/or a mass (e.g., weight) of the food item. According to an example, the following equation may be used when determining the outcome of decision 604: [(the current temperature of the food item)–(a target temperature of the food item)×(the specific heat capacity of the food item)×(mass of the food item)=the total amount of heat which should be extracted from the food item. Again, the current temperature of a food item may be determined using a thermal sensor and/or a thermal camera. Moreover, the specific heat capacity of a food item may be determined by identifying the type of food item. For instance, is the food item primarily liquid, solid, powder, etc. Moreover, different types of food items may correspond to different heat capacities which may be stored in memory, e.g., in a lookup table. Furthermore, a mass of the food item may be given a scaling factor which has an effect on the cooling strategy determined.

It follows that projecting whether a temperature of the first and/or second food items will reach a respective optimal temperature by the future event may include measuring the current temperatures and/or weights of the various food items using thermal sensors as described above. Moreover, specific heat capacities which correspond to the respective food items may be identified in response to recognizing a type of the respective food items, e.g., as would be appreciated by one skilled in the art after reading the present description.

Once the approximate temperature of the one or more food items has been determined using any of the processes described and/or suggested above, an extrapolation may be made as to whether the temperature of the one or more food items will reach their respective optimal temperatures by the time the future event occurs assuming the ambient storage temperature(s) thereof remain relatively constant. This extrapolation may be calculated using mathematical processes which would be apparent to one skilled in the art after reading the present description.

In response to determining that any of the one or more food items will not reach their respective optimal temperatures by the time the future event occurs, method 600 proceeds to operation 606. There, operation 606 includes adjusting (reducing) the ambient storage temperature in the compartments which the one or more food items are stored in. It follows that by reducing the ambient storage temperature as described, the rate at which the one or more food items are chilled to a desired temperature is accelerated. Again, the various different compartments in a refrigerator are preferably individually controllable and configured to maintain different unique ambient storage temperatures therein.

The amount by which the ambient storage temperature in the compartments is adjusted (reduced) in operation 606 may depend on the current temperature of the one or more food items, the time of the detected event, an amount by which the one or more food items will preferably be chilled, etc. In some approaches, the ambient storage temperature in a compartment may be reduced to the lowest possible temperature in order to maximize the rate by which the food items stored therein are chilled. This approach may be implemented in situations where the food items are resilient enough to withstand extremely low temperatures and/or if it is not possible for the food items stored therein to reach a desired temperature by the time they are to be used (e.g., consumed).

Returning to decision 604, method 600 proceeds to operation 608 in response to determining that each of the one or more food items will reach their respective optimal temperatures at least by the time the future event occurs. There, operation 608 includes maintaining the current settings of the refrigerator, thereby following the "normal" operation of the refrigerator according to the various approaches described in correspondence with method 400 of FIG. 4 above.

In one example of method 600 in use, assume a bottle of champagne is detected being placed in a refrigerator at 5 pm. A calendar event entitled "anniversary dinner" is detected using a word2vec correlation of the term "champagne" and "anniversary." The date and time of the calendar event are found to correspond to 7 pm, later that day. The ideal temperature of the champagne is 55 degrees Fahrenheit, and it is presumed the champagne is at room temperature when placed in the compartment. The system determines in operation 604 that the champagne will not reach the ideal temperature by 7 pm, and therefore accelerates the cooling thereof.

However, it should be noted that depending on the approach, the one or more food items determined to correspond to an upcoming event may be stored in a same compartment of the refrigerator or in different compartments of the refrigerator. Accordingly, in some approaches it may be determined that a food item stored in a first compartment may reach a desired temperature by the future event, while a second food item stored in a second compartment may not. It follows that it may be desirable to perform the various processes included in method 600 for each of the food items determined to correspond to the future event detected in operation 602, e.g., such that some food items may be chilled at a normal rate, while others may be chilled at an accelerated rate.

It follows that in addition to being able to recognize different types of food items inserted in different compartments of the refrigerator, some of the embodiments herein may also be able to automatically control an ambient storage temperature in certain compartments in view of the context of future events that incorporate food items stored therein. Thus, the automation of the food refrigeration as described herein is further improved.

Although some of the operations included in FIGS. 4 and 6 are described in such a way that insinuates that each new type of food item will be placed in its own compartment of the refrigerator, a refrigerator only has a finite amount of compartments and room included therein. Thus, over time food items being added to the refrigerator may be stored in a compartment which already includes food items which are a different type than the food item being added thereto. Conventionally, this process of grouping different types of food items together has been somewhat trivial as conventional refrigerators simply have one large compartment such that everything placed therein is subjected to the same storage temperature.

However, with the introduction of content and context aware storage of different types of food items, the significant increases in cooling efficiency for refrigeration units experienced on the microscopic level as described above, may also be achieved on the macroscopic (e.g., regional) level as well.

Figure 7:
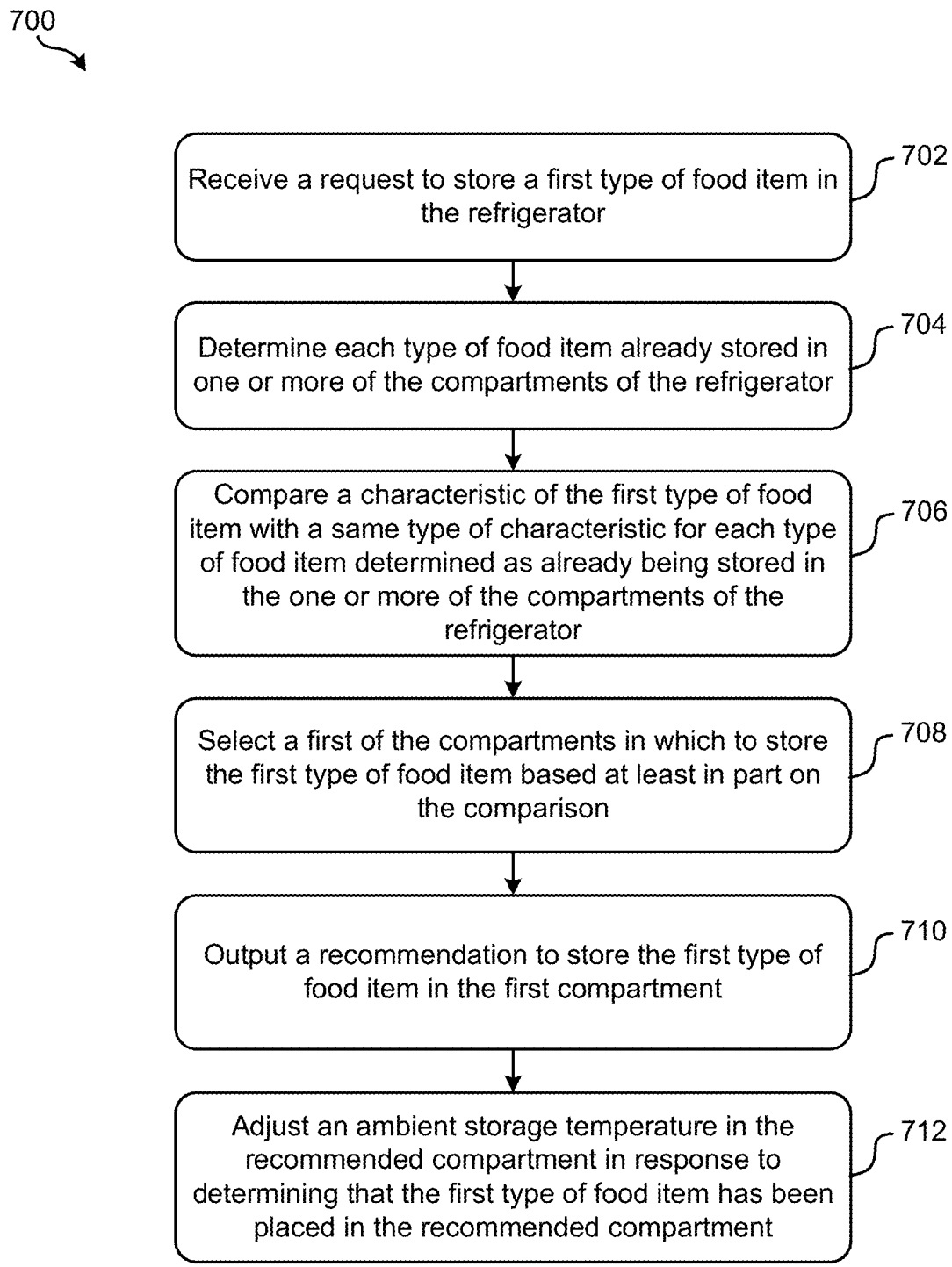
FIG. 7 is a flowchart of a method, in accordance with one embodiment.

Referring now to FIG. 7, a flowchart of a refrigerator-implemented method 700 for optimizing placement of food items in different compartments of a refrigerator unit is shown according to one embodiment. The method 700 may be performed in accordance with the present invention in any of the environments depicted in FIGS. 1-6, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, any one or more of the processes includes in method 700 may be performed by a controller (e.g., a processor) of a refrigerator. In other words, any one or more of the processes includes in method 700 may be performed by a refrigerator. In various other embodiments, the method 700 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, operation 702 of method 700 includes receiving a request to store a first type of food item in the refrigerator. The request may be received from a user. Moreover, depending on the approach, the request may be submitted to the refrigerator using a GUI on a display screen of the refrigerator, using voice recognition of the refrigerator, using a user mobile device which is wirelessly coupled to the refrigerator, etc.

Moreover, it should be noted that although operation 702 includes actually receiving a request to store the first type of food item in the refrigerator, in other approaches the refrigerator may actually be able to detect that a food item is or is going to be added to the refrigerator. Upon making this detection, the refrigerator (or a controller of the refrigerator and/or which the refrigerator is coupled to) may deduce that a recommendation on where to store the food item is desired. However, this feature may be selectively deactivated, ignored, overridden, etc. by the user in certain situations.

Upon receiving the request, method 700 further includes determining each type of food item already stored in one or more of the compartments of the refrigerator. See operation 704. As described above, the types of food items stored in various ones of the compartments in the refrigerator may be determined using detection hardware such as a digital camera, a barcode scanner, a wireless tag reader, etc. depending on the desired approach. Accordingly, operation 704 may be performed by implementing any of the approaches described above. Moreover, in another approach, the types of food items in each compartment may be retrieved from a database that tracks insertion and removal of food items from the compartments, e.g., in real time, thereby maintaining a current inventory of food items in the compartments at any given time.

Furthermore, operation 706 includes comparing a characteristic of the first type of food item with a same type of characteristic for each type of food item determined as already being stored in the one or more of the compartments of the refrigerator.

The characteristics which are preferably used when performing the comparison of operation 706 include the ideal storage temperatures or temperature ranges corresponding to each of the different types of food items. Accordingly, the ideal storage temperature or temperature range which corresponds to the first type of food item being inserted into the refrigerator may be compared against the ideal storage temperatures or temperature ranges of each of the other types of food items already stored in the refrigerator. It is also preferred that the comparison is made on a per-compartment basis. In other words, the ideal storage temperature of the first type of food item may be compared to an overall (e.g., average) ideal storage temperature of the food items stored in a same compartment. Thus, the first type of food item may not necessarily be compared to the characteristics of each type of food item already stored in the refrigerator, but rather the combined characteristics of the food items stored in a same compartment.

Operation 708 further includes selecting a first of the compartments in which to store the first type of food item based at least in part on the comparison. It follows that depending on what characteristics were incorporated into the evaluation performed in operation 706, a number of food items already stored in each of the compartments, a similarity between the first type of food item and the other food items already stored in the refrigerator, etc., a specific one of the compartments may be selected for the first type of food item to be added to.

In situations where there are one or more empty compartments in the refrigerator, the compartment selected in operation 708 may likely be one of the empty compartments unless another of the compartments includes the same or a similar type of food item. For example, if a user is attempting to add poultry (which has an ideal storage temperature of less than about 41 degrees Fahrenheit) to one of the compartments in a refrigerator, and every other compartment includes green bananas (which has an ideal storage temperature of about 65 degrees Fahrenheit), basil (which has an ideal storage temperature of about 56 degrees Fahrenheit), and unripe avocados (which has an ideal storage temperature of about 48 degrees Fahrenheit), it is preferred that the poultry be added to an empty compartment. By adding the poultry to a compartment which already has another food item stored therein with an ideal storage temperature significantly warmer than that of the poultry, a decay rate of one or both of the food items would be accelerated as neither would be stored at a desirable temperature.

However, in situations where each of the compartments already includes at least one type of food item stored therein, the compartment selected in operation 708 may be a compartment which has a current ambient storage temperature which is closest to the ideal storage temperature associated with the first type of food item. By doing so, the ambient storage temperature may be changed a minimal amount, thereby ensuring a most effective storage environment for the different types of food items in the refrigerator as a whole. In other approaches, the compartment selected in operation 708 may be based on one or more chemical characteristics of the food items already stored therein and/or of the food item being added thereto. Some produce emits byproducts, e.g., such as ethylene gas which is a natural plant hormone that helps fruit ripen. Other food items may be sensitive to these byproducts, and may thereby be effected by their emission. Accordingly, by selectively grouping certain food items in compartments based on their chemical characteristics, the effective shelf life of the food items may be desirably optimized. Accordingly, a recommendation may be made to consolidate certain food items that are stored in different compartments, such that a more efficient use of the compartments may be made, e.g., as will be described in further detail below.

It is also desirable that the temperature gradients between directly adjacent (e.g., contiguous) compartments is minimized. By minimizing temperature gradients between directly adjacent compartments both vertically and horizontally, the amount of temperature interference which occurs between food items in the directly adjacent compartments is also minimized. The laws of thermodynamics define that heat flows from objects that are hotter to objects that are colder at least relative to each other. Thus, the lower the temperature gradients are between directly adjacent compartments, the less heat (or energy) is lost to inefficiencies of the refrigerator (thermal system) as a whole. Accordingly, energy consumption may be reduced, dew condensation on interior and/or exterior surfaces of the compartments may be minimized, etc.

It follows that if there are more than one empty storage compartments in the refrigerator and none of the other compartments include food items which are the same or sufficiently similar to the first type of food item being added, operation 708 preferably selects the empty compartment which shares a wall with another compartment having an ambient storage temperature which is closest to the ideal storage temperature associated with the first type of food item. However, if each of the storage compartments already include at least one food item stored therein, operation 708 preferably selects the compartment which not only has an ambient storage temperature which is closes to the ideal storage temperature associated with the first type of food item, but which also is directly adjacent another compartment having an ambient storage temperature which results in the lowest temperature gradient therebetween.

After a compartment has been selected in operation 708, method 700 further includes outputting a recommendation to store the first type of food item in the first compartment. See operation 710. The recommendation is preferably output using an output device, e.g., such as a display screen on the refrigerator, a speaker which informs the user of the recommendation using sound, sending a message to a mobile device of the user, by selectively activating lights in the recommended compartment, etc.

Furthermore, should a user decide to follow the recommendation and actually place the first type of food item into the compartment output in operation 710, adjustments may be made to the ambient storage temperature therein. Accordingly, operation 712 includes adjusting an ambient storage temperature in the recommended compartment in response to determining that the first type of food item has been placed in the recommended compartment.

In situations where the recommended compartment was empty prior to the first type of food item being added thereto, operation 712 may simply include adjusting the ambient storage temperature of the recommended compartment to substantially match an ideal storage temperature associated with the first type of food item. Accordingly, operation 712 may be performed according to any of the approaches described above (e.g., see operation 408 of FIG. 4). However, in other approaches, the recommended compartment may already include one or more other types of food items stored therein.

Accordingly, the ambient storage temperature in the recommended compartment may not be adjusted to a temperature that substantially matches an ideal storage temperature associated with the first type of food item, but rather an ambient storage temperature which best serves the different food items stored therein as a whole. Thus, in some approaches operation 712 may include adjusting the ambient storage temperature in the recommended compartment to an average between the ideal storage temperature associated with the first type of food item and an ideal storage temperature associated with the other types of food items already stored in the first compartment. In other approaches, operation 712 may include adjusting the ambient storage temperature in the recommended compartment to an average between the ideal storage temperature associated with the first type of food item and a current ambient storage temperature of the recommended compartment.

Although it is desirable to maintain an arrangement of food items throughout the compartments such that the temperature gradients between directly adjacent compartments is minimized, this may not always be the case. For instance, a user may ignore recommended compartments for various food items because they are in a rush, thereby potentially mixing food items having very different ideal storage temperatures in the same compartment and/or placing food items having very different ideal storage temperatures in directly adjacent compartments. It follows that the refrigerator is preferably able to survey and evaluate the placement of various food items in the different compartments and suggest a rearrangement of the food items. Accordingly, looking now to FIG. 8, a flowchart of a method 800 for optimizing placement of food items in different compartments of a refrigerator unit is illustrated according to one embodiment. The method 800 may be performed in accordance with the present invention in any of the environments depicted in FIGS. 1-7, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

Figure 8:
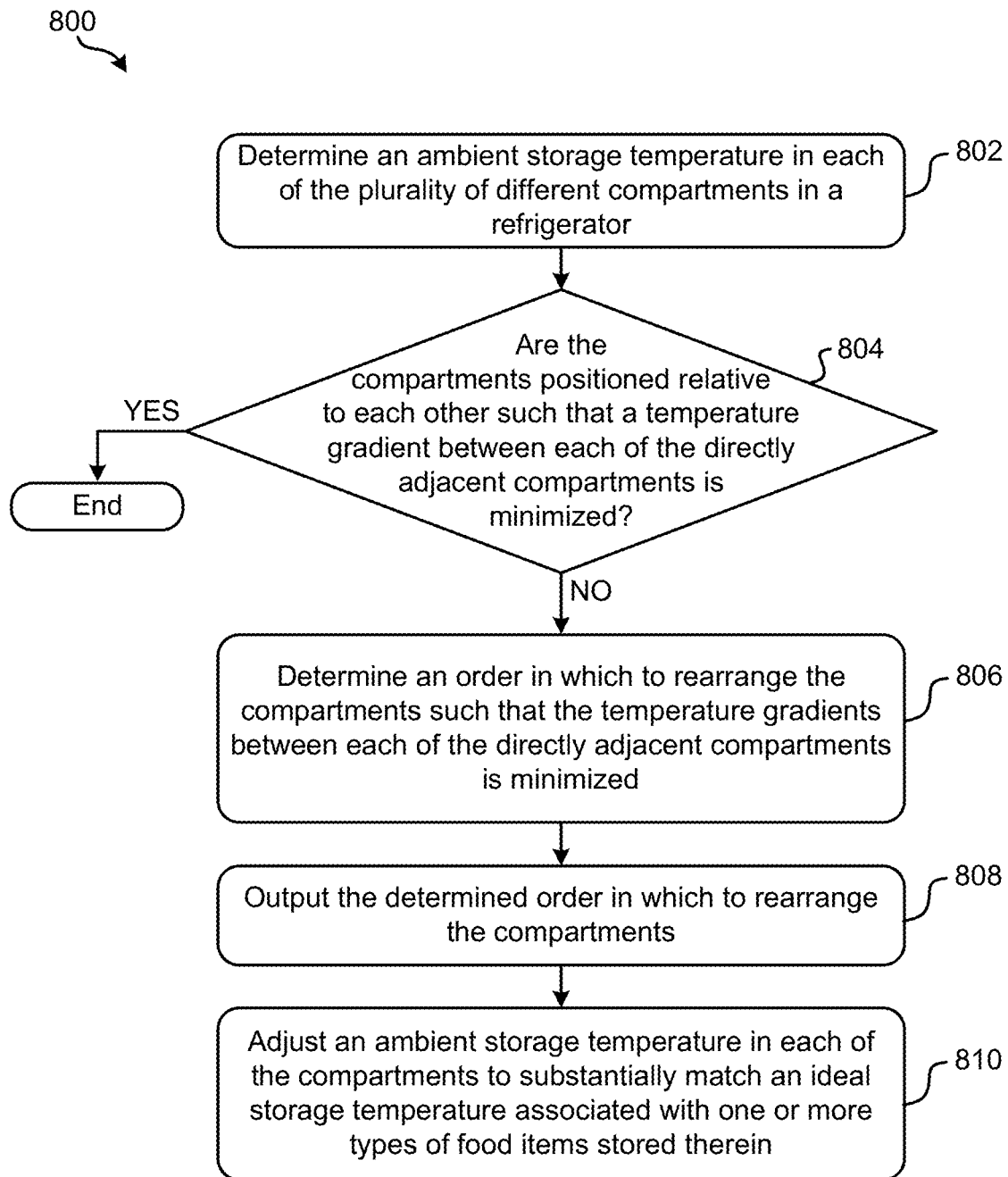
FIG. 8 is a flowchart of a method, in accordance with one embodiment.

As shown in FIG. 8, operation 802 of method 800 includes determining an ambient storage temperature in each of the plurality of different compartments in a refrigerator. According to some approaches, a temperature sensor may be placed in each of the compartments which may allow a central controller to easily determine an ambient storage temperature in each of the compartments. In other approaches, ambient storage temperatures for each of the compartments may be stored in memory (e.g., in a lookup table). Thus, operation 802 may be performed by accessing memory. In still other approaches, the ambient storage temperatures may be derived by evaluating the types of food items stored in each of the compartments and calculating an average temperature for each compartment based on the ideal storage temperature for each of the food items therein.

Moreover, operation 804 includes evaluating whether the compartments are positioned relative to each other such that a temperature gradient between each of the directly adjacent compartments is minimized. As described above, by minimizing temperature gradients between directly adjacent compartments both vertically and horizontally, the amount of temperature interference which occurs between food items in the directly adjacent compartments is also minimized. Thus, the lower the temperature gradients are between directly adjacent compartments, the less heat (or energy) is lost to inefficiencies of the refrigerator (thermal system) as a whole. Accordingly, energy consumption may be reduced, dew condensation on interior and/or exterior surfaces of the compartments may be minimized, etc.

As shown, method 800 ends in response to determining that the compartments are positioned relative to each other such that a temperature gradient between each of the directly adjacent compartments is minimized. However, method 800 proceeds to operation 806 in response to determining that the compartments are positioned relative to each other such that a temperature gradient between each of the directly adjacent compartments is not minimized. In other words, method 800 proceeds to operation 806 in response to determining that the arrangement of compartments can be rearranged such that performance of the refrigerator as a whole is improved.

Accordingly, operation 806 includes determining an order in which to rearrange the compartments such that the temperature gradients between each of the directly adjacent compartments is minimized. It is preferred that operation 806 is performed with all of the compartments in mind rather than simply evaluating single pairs of the compartments. Thus, a combined temperature gradient across all directly adjacent compartments may desirably be reduced should the compartments be rearranged according to the order determined in operation 806. As described above, it may be desirable to also rearrange the combination of food items that are included in each of the compartments. Over time, as food items are added to and removed from various compartments, the most efficient use of the refrigerator space may be to combine food items that are stored in separate compartments, but which have a closets ideal storage temperature currently. By doing so, space may be freed for food items having an ideal storage temperature much higher or lower than the food items which are now combined, thereby improving performance and increasing efficiency of the refrigerator as a whole.

With continued reference to FIG. 8, operation 808 includes outputting the determined order in which to rearrange the compartments. Thus, operation 808 effectively includes outputting a recommended arrangement of the various food items in the different compartments which improves efficiency and performance of the refrigerator as a whole. The determined order is preferably output using an output device, e.g., such as a display screen on the refrigerator, a speaker which informs the user of the recommendation using sound, sending a message to a mobile device of the user, by selectively activating lights in the recommended compartment, etc.

It should also be noted that although method 800 references an order in which to arrange/rearrange the compartments, the compartments themselves may not actually be rearranged, but rather the food items in each of the compartments may be rearranged. Thus, the effective result may be the same as if the compartments themselves had been rearranged, but it is in no way required to physically rearrange the compartments themselves in the refrigerator.

Should a user decide to follow the recommendation and actually rearrange the compartments according to the recommendation output in operation 808, adjustments may be made to the ambient storage temperature in each of the compartments accordingly. As described throughout, each of the compartments are preferably individually controllable and configured to maintain different unique respective ambient storage temperatures based on the types of food items stored therein. Thus, operation 810 includes adjusting an ambient storage temperature in each of the compartments to substantially match an ideal storage temperature associated with one or more types of food items stored therein. For example, the ambient storage temperature for a given compartment may be adjusted to a temperature which is an average of the ideal storage temperatures associated with the various types of food items stored therein. However, as alluded to above, a user may ultimately ignore the recommendations output by method 800. It follows that operation 810 may only be performed in response to determining that the compartments have actually been rearranged into the determined order.

In addition to maintaining a desirable, efficient organization of various food items in the compartments of a refrigerator in a closed system, it is also preferred that the processes included in method 800 are implemented on the fly as food items are added to and/or removed from the various compartments in a refrigerator. Thus, it is preferred that any one or more of the processes described in FIG. 8 may be integrated with various ones of the other processes included in method 400 of FIG. 4, method 600 of FIG. 6 and/or method 700 of FIG. 7, e.g., as would be appreciated by one skilled in the art after reading the present description.

It follows that various ones of the embodiments described and/or suggested herein are able to actively and automatically control the temperature of each compartment in a refrigerator depending on the type of food item(s) stored therein. As a result, performance of a refrigerator as a whole is significantly improved, items stored in the refrigerator gain a longer storage life, consumption of resources (electricity) is reduced, etc.

Moreover, the improvements in performance achieved by the various embodiments herein provide a number of benefits. For example, smart appliances are a new, growing market which may benefit from various ones of the improvements achieved herein. Moreover, these improvements in smart appliances may further be amplified in view of the rapid integration of Artificial Intelligence with home appliances, home internet of things (IoT), etc.

Furthermore, food recognition based applications may be developed which integrate user context recognition, food status predictions, etc. Moreover, these food recognition based applications may be able to recommend recipes and other uses for various food items stored in a refrigerator based on a deduced relative freshness of the food item. This may further reduce food waste and increase the chances of food distribution to those in need, thereby achieving improvements in national/global societal issues as well as the environment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A refrigerator-implemented method for optimizing placement of food items in different compartments of a refrigerator, comprising:
   receiving, by the refrigerator, a request to store a first type of food item in the refrigerator;
   determining, by the refrigerator, using detection hardware, each type of food item already stored in at least three compartments of the refrigerator;
   comparing, by the refrigerator, a characteristic of the first type of food item with a same type of characteristic for each type of food item already stored in the at least three compartments of the refrigerator;
   selecting, by the refrigerator, a first of the compartments in which to store the first type of food item based at least in part on the comparison, wherein the first compartment has an ambient storage temperature which is closest to a predefined ideal storage temperature associated with the first type of food item;
   outputting, by the refrigerator, using an output device, a recommendation to store the first type of food item in the first compartment; and
   adjusting, by the refrigerator, an ambient storage temperature in the first compartment to substantially match the predefined ideal storage temperature associated with the first type of food item in response to determining that the first type of food item has been placed in the recommended first compartment, wherein the first compartment is directly adjacent a second one of the compartments, the second one of the compartments having an ambient storage temperature which is closest to the adjusted ambient storage temperature of the first compartment.

2. The refrigerator-implemented method of claim 1, wherein the detection hardware is selected from the group consisting of: a digital camera, a barcode scanner, and a wireless tag reader.

3. The refrigerator-implemented method of claim 2, wherein determining, using detection hardware, each type of food item already stored in one or more of the compartments of the refrigerator includes using the digital camera, and image recognition software in combination with an input from the digital camera.

4. The refrigerator-implemented method of claim 1, wherein the first compartment has an ambient storage temperature which is closest to the predefined ideal storage temperature associated with the first type of food item.

5. The refrigerator-implemented method of claim 1, wherein each of the compartments are individually controllable by the refrigerator and configured to maintain different respective ambient storage temperatures based on the types of food items therein.

6. The refrigerator-implemented method of claim 1, wherein the ambient storage temperatures of at least two of the at least three compartments are within a range of 30 and 65 degrees Fahrenheit.

7. The refrigerator-implemented method of claim 1, wherein the characteristic of the first type of food item is a chemical characteristic of the first type of food item and/or the predefined ideal storage temperature of the first type of food item.

8. The refrigerator-implemented method of claim 1, wherein selecting the first of the compartments in which to store the first type of food item includes:
   identifying the second compartment as having an ambient storage temperature which is second closest to the predefined ideal storage temperature associated with the first type of food item; and
   recommending that the food item be placed in the first compartment directly adjacent the second compartment such that a temperature gradient across a boundary between the first and second compartments is minimized.

9. A computer program product for optimizing placement of food items in different compartments of a refrigerator, the computer program product comprising a computer readable storage medium having program instructions embodied therewith, wherein the computer readable storage medium is not a transitory signal, the program instructions readable and/or executable by a processor to cause the processor to perform a method comprising:

determining, by the processor, an ambient storage temperature in each of at least three of the different compartments of the refrigerator;

evaluating, by the processor, whether the compartments are positioned relative to each other such that a temperature gradient across a boundary of the compartments between each pair of directly adjacent compartments is minimized, wherein the at least three compartments are thermally insulated to maintain different unique ambient storage temperatures therein, wherein each of the at least three compartments is individually controllable and configured to maintain different respective ambient storage temperatures based on types of food items therein;

determining, by the processor, an order in which to rearrange the compartments in response to determining that the compartments are not positioned relative to each other such that a temperature gradient across the boundary of the compartments between each of the pairs of directly adjacent compartments is minimized; and outputting, by the processor and using an output device, the determined order in which to rearrange the compartments.

10. The computer program product of claim 9, wherein each of the at least three different compartments maintains a unique ambient temperature, wherein each of the unique ambient temperature within a range of 30 and 65 degrees Fahrenheit.

11. The computer program product of claim 9, the program instructions readable and/or executable by the processor to cause the processor to perform the method comprising:

adjusting, by the processor, an ambient storage temperature in each of the compartments to substantially match a predefined ideal storage temperature associated with one or more types of food items stored therein in response to determining that the compartments have been rearranged into the determined order.

12. The computer program product of claim 9, the program instructions readable and/or executable by the processor to cause the processor to perform the method comprising:

receiving, by the processor, a request to store a first type of food item in the refrigerator;

comparing, by the processor, a characteristic of the first type of food item with the ambient storage temperature in each of the different compartments of the refrigerator;

selecting, by the processor, a first of the compartments in which to store the first type of food item based at least in part on the comparison; and outputting, by the processor and using the output device, a recommendation to store the first type of food item in the first compartment.

13. The computer program product of claim 12, wherein the first compartment has an ambient storage temperature which is closest to a predefined ideal storage temperature associated with the first type of food item.

14. A refrigerator, comprising:

sensors for determining types of food items in each of a plurality of compartments in the refrigerator;

a controller in communication with the sensors, the controller being configured to:

receive a request to store a first type of food item in the refrigerator;

determine, using detection hardware, each type of food item already stored in at least three of the compartments of the refrigerator, wherein the at least three compartments are thermally insulated to maintain different unique ambient storage temperatures therein;

compare a characteristic of the first type of food item with a same type of characteristic for each type of food item already stored in the one or more of the compartments of the refrigerator; and select a first of the compartments in which to store the first type of food item based at least in part on the comparison, wherein the first compartment is directly adjacent a second one of the compartments, the second one of the compartments having an ambient storage temperature which is second closest to a predefined ideal storage temperature associated with the first type of food item; and an output device for outputting a recommendation to store the first type of food item in the first compartment.

15. The refrigerator of claim 14, wherein determining, using detection hardware, each type of food item already stored in one or more of the compartments of the refrigerator includes using a digital camera, and image recognition software in combination with an input from the digital camera.

16. The refrigerator of claim 14, wherein the first compartment has an ambient storage temperature which is closest to the predefined ideal storage temperature associated with the first type of food item.

17. The refrigerator of claim 14, wherein each of the compartments are individually controllable and configured to maintain different respective ambient storage temperatures based on the types of food items therein.

18. The refrigerator of claim 14, the controller being configured to:

adjust an ambient storage temperature in the first compartment to substantially match the predefined ideal storage temperature associated with the first type of food item in response to determining that the first type of food item has been placed in the recommended first compartment.

19. The refrigerator of claim 14, the controller being configured to:

adjust an ambient storage temperature in the first compartment to a value which is an average between the predefined ideal storage temperature associated with the first type of food item and a current ambient storage temperature in the first compartment in response to determining that the first type of food item has been placed in the recommended first compartment.

20. The refrigerator of claim 14, wherein selecting the first of the compartments in which to store the first type of food item includes:

identifying the first compartment as having an ambient storage temperature which is closest to the predefined ideal storage temperature associated with the first type of food item; and identifying the second compartment as being directly adjacent the first compartment and as having the ambient storage temperature which is second closest to the predefined ideal storage temperature associated with the first type of food item.

* * * * *